United States Patent [19]

Axelson

[11] Patent Number: 4,668,856
[45] Date of Patent: May 26, 1987

[54] METHOD OF CONTROLLING THE HEATING OF AN AQUEOUS LOAD IN A COOKING UTENSIL

[75] Inventor: Claes J. H. Axelson, Stockholm, Sweden

[73] Assignee: AB Electrolux, Stockholm, Sweden

[21] Appl. No.: 813,997

[22] Filed: Dec. 27, 1985

[30] Foreign Application Priority Data

Jan. 9, 1985 [SE] Sweden .............................. 8500094

[51] Int. Cl.$^4$ ........................................... H05B 1/02
[52] U.S. Cl. .................................... 219/497; 219/494; 219/501; 219/330; 99/325; 99/330; 426/523
[58] Field of Search ............... 219/494, 331, 497, 321, 219/499, 331, 501, 330, 492, 493, 491; 99/325, 326, 328, 331, 330, 332; 426/520, 523

[56] References Cited

U.S. PATENT DOCUMENTS

| | | | |
|---|---|---|---|
| 4,379,964 | 4/1983 | Kanazawa et al. | 219/497 |
| 4,405,855 | 9/1983 | Kolle et al. | 219/494 |
| 4,461,951 | 7/1984 | Luoma, II et al. | 219/497 |
| 4,587,405 | 5/1986 | Andre | 219/497 |

Primary Examiner—M. H. Paschall
Attorney, Agent, or Firm—Alfred E. Miller

[57] ABSTRACT

A method of controlling the heating of an aqueous load in a cooking utensil, which is placed on an electrically heated cooking plate or hob. During the heating process, at repeated occasions measured values are collected relating to the temperature ($T_p$) of the cooking plate and the temperature ($T_k$) of the cooking utensil, respectively, and at each occasion of measurement and end temperature ($T_{v\,end}$) of the load is calculated from the collected measured values, which end temperature would be achieved if the power supply to the cooking plate was disrupted at that time. The power supply to the cooking plate is disrupted when the calculated end temperature ($T_{v\,end}$) equals a preset temperature value.

10 Claims, 4 Drawing Figures

4,668,856

METHOD OF CONTROLLING THE HEATING OF AN AQUEOUS LOAD IN A COOKING UTENSIL

This invention relates to a method of controlling the heating of an aqueous load in a cooking utensil which is placed on an electrically heated plate or hob.

BACKGROUND OF THE INVENTION

For optimum heating by the aid of thermostatically controlled electric heating cooking plates or hobs it is desired that the maximum power is on as long as possible without the plate being warmer than necessary when the load has reached the cooking temperature. Earlier known thermostats operate in a way such that they switch off the power when a measured temperature $T_F$ reaches a pre-set value. This temperature $T_F$ is a combination of the temperature $T_P$ of the cooking plate and the temperature $T_k$ of the cooking utensil, the ratio of combination being greatly dependent on the bearing of the cooking utensil against the cooking plate represented by the thermal resistance $R_{pk}$ and the magnitude $m_v$ of the load (the thermal mass of the load). Thus, the moment at which the power is switched off will not always be the optimum one but may vary.

SUMMARY OF THE INVENTION

The main object of the invention is to provide a method of controlling the heating process of an aqueous load in which the said drawback is removed and, instead, the power is switched off well in time for the heat remaining in the cooking plate to be sufficient for the load to precisely reach a predetermined temperature, usually the cooking temperature. During a following completing cooking process a lower power is supplied, which also brings about a lower temperature of the cooking plate. The invention lowers the temperature from the high value during the heating up process to the said lower value during the time period at which the load reaches its cooking temperature. Thereby a smooth temperature increase towards the selected end temperature (for example the cooking temperature) is provided without the variations up and down of the temperature of the cooking plate which currently appear in known thermostatically controlled cooking plates before the cooking plate temperature reaches a stable value corresponding to the selected value of the end temperature.

Other objects and advantages will appear in the following description of a method in accordance with the invention with reference to the accompanying drawings in which FIG. 1 schematically illustrates a model of a cooking plate with cooking utensil and with different parameters inserted.

Figure 4:
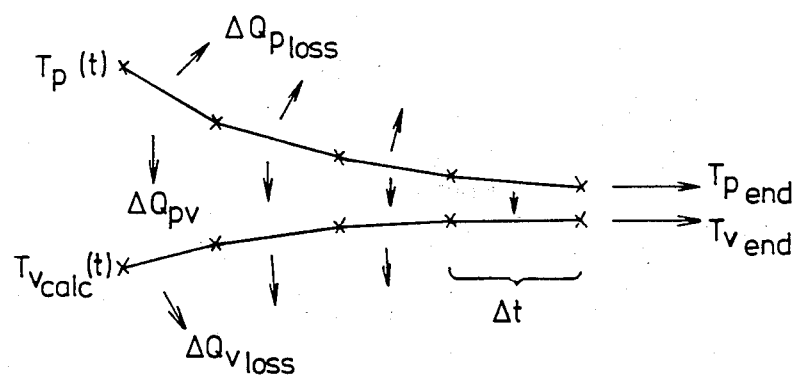

FIG. 4, finally, illustrates an iterative calculation process for the end teperatures of the load ($T_{v\,end}$) and the cooking plate ($T_{p\,end}$), respectively.

DETAILED DISCLOSURE OF THE INVENTION

As mentioned above the object of the invention is to achieve a quick heating of an aqueous load to a predetermined temperature, usually the cooking temperature of the load. Heating up should be at maximum power and the power should be lowered at exactly the right moment so as to prevent excessive cooking. In the event the process also includes a subsequent cooking period the latter should process if possible without any noticeable fluctuations of the cooking temperature. Briefly stated, in accordance with the invention, by repeated measurement of the temperature $T_p$ of the cooking plate on one hand and the temperature $T_k$ of the cooking utensil on the other hand, using calculated, known or estimated parameters, an end temperature $T_{v\,end}$ can be determined which the load would reach if the power of the cooking plate were switched off at this moment. When this determined end temperature corresponds to the predetermined temperature of the load, for example the cooking temperature, the power is switched off and solely the heat stored in the cooking plate and in the utensil supplies the finishing smooth heating to cooking temperature.

Figure 1:
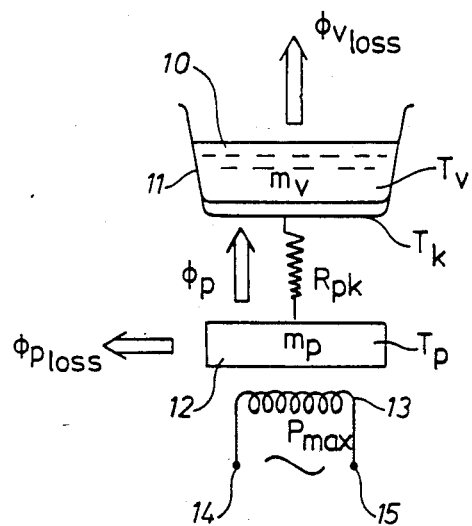

Referring to FIG. 1 the following numerals will be applied. It is assumed that a load 10 in the form of water is to be heated in a pan 11 placed on a cooking plate 12 which is heated by heating coils 13 connected to the electric mains via terminals 14, 15. The quantity of water is represented by a thermal mass $m_v$ which has a temperature $T_v$. Correspondingly, the cooking plate has a thermal mass $m_p$, and the temperature of the plate is denoted by $T_p$. The temperature of the pan, which is the measure of the temperature of the load, is denoted by $T_k$. When heated by the heating coils 13, the cooking plate, whose maximum output is denoted by $P_{max}$, supplies to the pan 11 the heating power or heating flow $\phi_p$, the magnitude of which is determined by the thermal resistance $R_{pk}$ between cooking plate and pan. The losses are the losses $\phi_{v\,loss}$ of the load (radiation and evaporation) and the losses $\phi_{p\,loss}$ of the cooking plate. The cooking plate is normally secured to a cooker top, not shown, and $\phi_{p\,loss}$ relates to losses to the ambience via the attachment.

Assuming that the thermal parameters of the cooking plate are known it is possible on the basis of the measured periods of time $T_p = f(t)$ and $T_k = f(t)$ to determine the values of the parameters which are of importance for determining the $T_{v\,end}$. As regards the temperatures $T_p$ and $T_k$ they are measured by sensors sensing the temperature of the cooking plate ($T_p$) and abutting the bottom of the pan ($T_k$). The temperature sensor of $T_p$ should be placed so as to sense the average temperature of the cooking plate. No heat transfer from the heating coils 13 to the sensor must occur. The temperature $t_k$ represents the exterior surface temperature of the centre of the pan bottom.

In the practical application $T_{v\,end}$ is determined by an iterative calculation preferably done by the aid of a computer. The principle of the calculation appears in FIG. 3 which illustrates a flow diagram of the calculations which as a result shall give $T_{v\,end}$. Briefly the calculation comprises measuring corresponding values of $T_p$ and $T_k$, respectively, at short intervals, for example every ten seconds, after which for each pair of values a temperature equalizing process is simulated, which would occur if the cooking plate were switched off and solely the energy stored in the cooking plate and the cooking utensil, respectively, were active. The temperature equalization process of $T_p$ and $T_v$, respectively, are illustrated in FIG. 4 in which appears that new values of $T_p$ respectively $T_v$ are determined for even intervals, for example 30 seconds, until $T_{v\,end}$ and the corresponding $T_p$ have been reached. How to establish that the end values of $T_v$ and $T_p$ have been reached will be described with reference to FIG. 3. In this connection only added new references will be explained.

As already said above firstly $T_p$ and $T_k$, respectively, are measured and from these values an estimated load temperature $T_{v\,calc}$ can be determined by the relation:

$$T_{v\,calc} = T_k - \frac{R_{kv}}{R_{pk}} \cdot (T_p - T_k)$$

$R_{kv}$ is the thermal resistance between cooking utensil and load which is dependent on $T_k$ according to the relation $$R_{kv} = k \cdot \sqrt{\frac{1}{T_k}},$$

in which k is a constant.

$R_{pk}$ (see FIG. 1) is determined by the relation $$R_{pk} = \frac{T_p - T_k}{\phi_p} \; [^\circ C./W]$$

in which the heat flow $\phi_p$ in turn is determined by the relation $$\phi_p = P - \frac{dT_p}{dt} \cdot m_p - \phi_{p\,loss} \; [W]$$

P is the effective power which is switched in to the cooking plate and which can vary between a maximum value $P_{max}$ and zero. If greater accuracy is desired P can be replaced by an effective power $P_{filt}$ which is P filtered by the time constant of the heating coils of the plate.

$(dT_p)/(dt)$, which is the time derivative of $T_p$, can easily be determined by a comparison between two adjacent $T_p$ values.

$\phi_{p\,loss}$ is proportional to $T_p$ according to the relation $$\phi_{p\,loss} = 1 \cdot T_p,$$

wherein 1 is a constant.

When $T_{v\,calc}$ has been determined formulas are set up for the heat quantities concerned during the predetermined interval $\Delta t$, which for example can be 30 seconds. The heat quantities are:

$$\Delta Q_{p\,loss} = \phi_{p\,loss} \cdot \Delta t$$

$$\Delta Q_{v\,loss} = \phi_{v\,loss} \cdot \Delta t$$

$$\Delta Q_{pv} = \frac{T_p - T_v}{R_{pk}} \cdot \Delta t$$

In addition to the values determined earlier $\phi_{v\,loss}$ has to be known which can be determined by $T_{v\,calc}$ according to the relation $$\phi_{v\,loss} = m \cdot T_{v\,calc},$$

wherein m is a constant.

The next step in the calculation process is to calculate new values of $T_p$ and $T_v$ after the time $\Delta t$ according to the relations $$T_p(t+\Delta t) = T_p(t) - (\Delta Q_{pv} + \Delta Q_{p\,loss})/m_p$$

$$T_v(t+\Delta t) = T_v(t) + (\Delta Q_{pv} - \Delta Q_{v\,loss})/m_v$$

wherein t indicates the time at which the immediately preceding measurement of $T_p$ respectively $T_k$ was made.

The thermal mass $m_p$ of the cooking plate has a certain value in $J/^\circ C$. The magnitude of the load referred to as its thermal mass $m_v$ is estimated according to the relation $$m_v = \frac{\phi_p}{\frac{dT_v}{dt}} \; [J/^\circ C.]$$

$$\frac{dT_v}{dt}$$

is the time derivative of the load temperature and can be considered to sufficiently accurately correspond to $$\frac{dT_k}{dt}.$$

Figure 3:
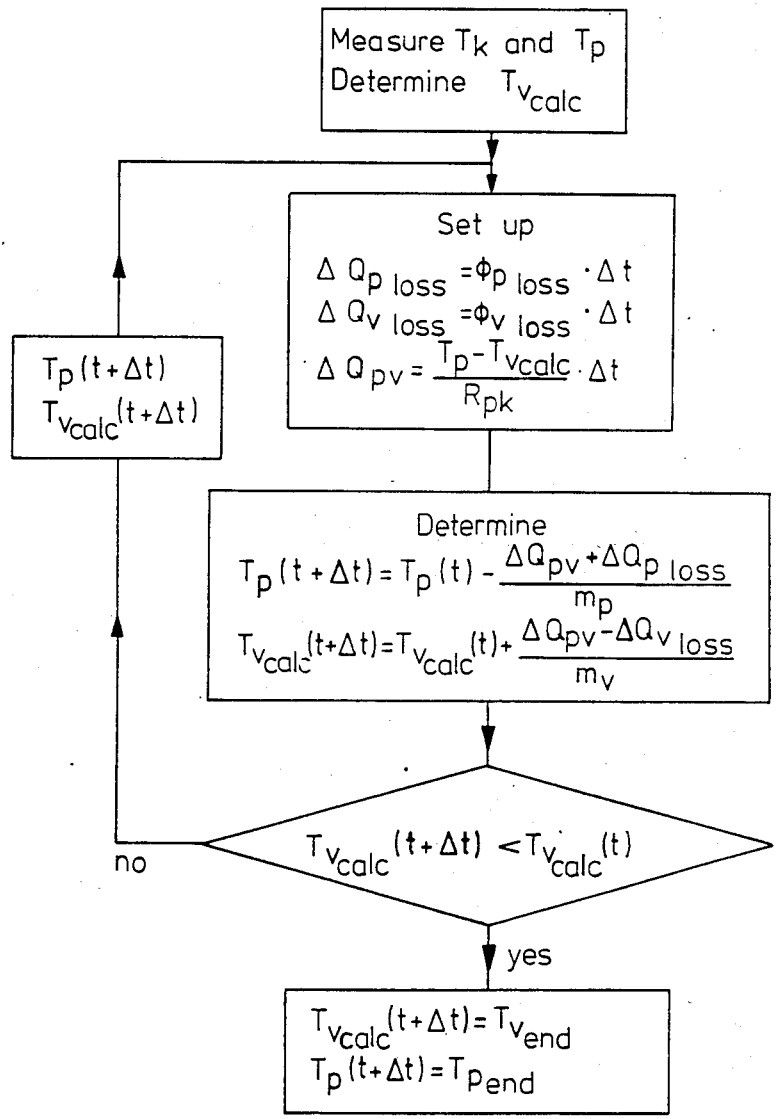
FIG. 3 is a flow diagram of a computer programme suitable for calculating the end temperature $T_{v\,end}$ of the load.

In the subsequent step of the flow diagram $T_v(t+\Delta t)$ is compared with $T_v(t)$ and as long as the previous value is greater than the latter value the programme is run in the loop shown in FIG. 3 using the values of $T_p$ and $T_v$ thus calculated as new input values in order to obtain new values after another time $\Delta t$.

When $T_v$ after a number of calculations tends to fall and $T_v(t+\Delta t)$ thus is below $T_v(t)$ this is an indication that $T_{v\,end}$ and its corresponding value $T_{p\,end}$ have been reached.

The iterative calculation process described occurs repeatedly during the heating up stage, for example every ten seconds. An example of the process of such a calculation is illustrated in the diagram of FIG. 4. It is assumed that the supply of power to the cooking plate is interrupted at the time t, and after that the temperature of the cooking plate will fall continuously due to the fact that for each interval $\Delta t$ the plate will emit the heat quantity $\Delta Q_{p\,loss}$ to the ambience and the heat quantity $\Delta Q_{pv}$ to the load. These heat quantities are determined according to the formulas outlined above at each point marked by a cross in the diagram. In the same way the temperature $T_v$ of the load will rise as a result of the heat quantity $(\Delta Q_{pv} - \Delta Q_{v\,loss})$ being supplied. After a number of intervals $\Delta t$ the temperatures $T_{p\,end}$ and $T_{v\,end}$ have been reached which, as said above, has occurred when $T_{v\,end}$ tends to fall.

The iterative calculation of $T_{v\,end}$ according to FIG. 3 occurs repeatedly about every ten seconds, and each value is compared to the predetermined end temperature, usually the cooking temperature of the load. When $T_{v\,end}$ corresponds to the predetermined temperature the cooking plate is switched off and the real temperature equalization process starts. During this process the measurement of $T_p$ and $T_k$ continues as before. When now $T_p$ falls the sources of error in the calculations will be reduced and $T_{v\,end}$ will successively be calculated with growing accuracy. Afterwards-corrections can be done during the equalization process by supplying additional power pulses to the cooking plate, if necessary. When equalization is considered to be obtained and $T_v$ has reached the predetermined temperature the cooking plate is again switched in but now with a lower effective power in the process of finished cooking. This process can be controlled in the usual manner by keeping the temperature $T_k$ of the cooking utensil constant.

Figure 2:
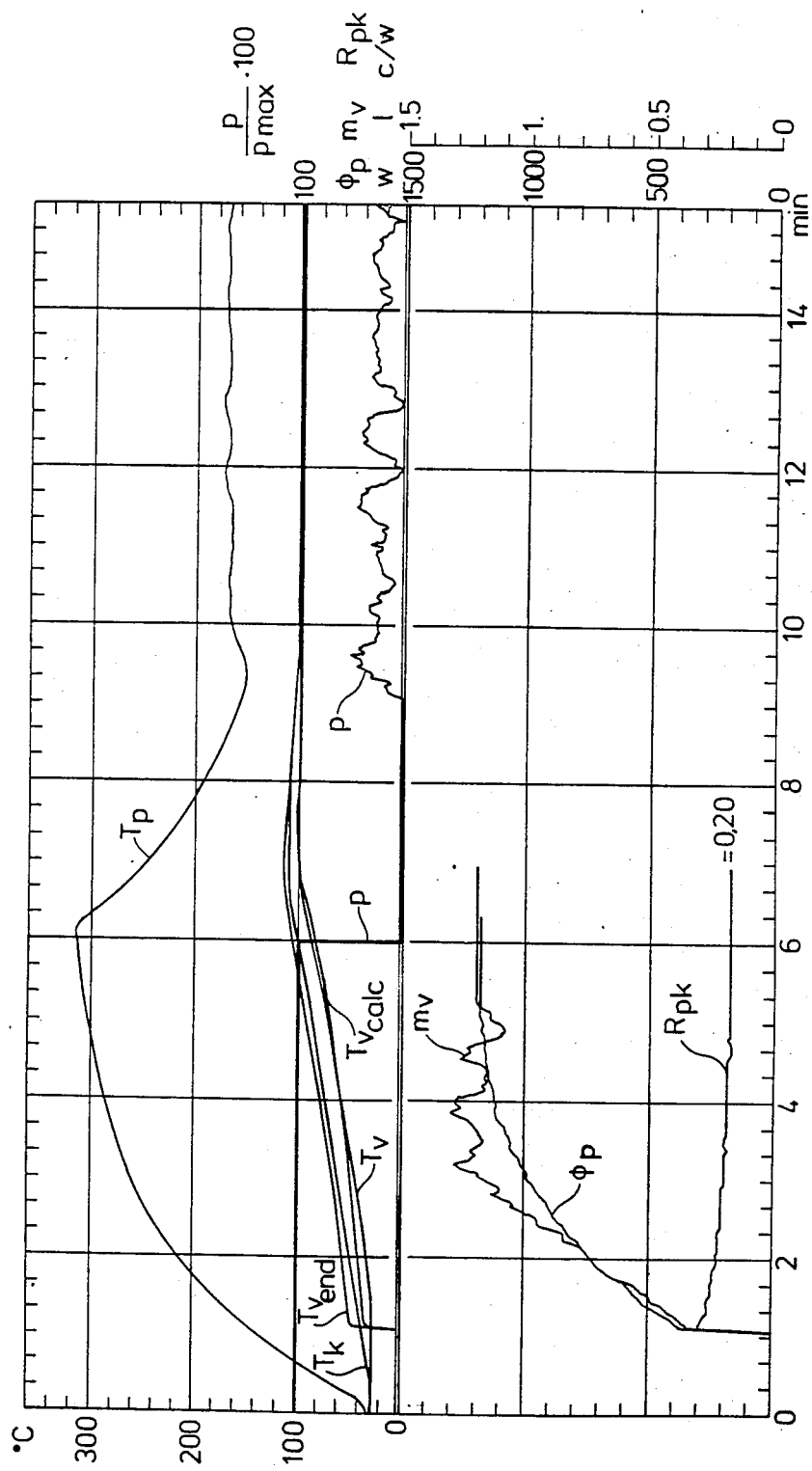
FIG. 2 is a diagram with graphic representation of the parameters concerned.

In FIG. 2 the results of a test are shown in which one liter of water has been heated in a two-liter pan without cover. The heating up process is followed by a thermostatically controlled further cooking which may be suitable in case the load is to be ready-cooked at low cooking intensity. The diagram of the Figure has an upper part and a lower part. In the upper part the temperatures $T_p$, $T_k$, $T_v$, $T_{v\,calc}$ and $T_{v\,end}$ are shown as is also the input power P. In the lower part curves relating to $m_v$, $\phi_p$ and $R_{pk}$ are shown.

The cooking plate, whose maximum effective power is 1500 W and has a diameter of 180 mm, is switched on at the time t=0 and remains switched in until $T_{v\,end}$ reaches 100° C. and the power is switched off. This occurs after about 6 minutes. During the heating process $T_p$ rises exponentially to about 300° C. and then during the temperature equalization process falls to about 170° C., which is a temperature suitable for the subsequent ready-cooking process. As is also seen in the diagram, $T_v$ follows the curve $T_{v\,end}$ and reaches after about 7 minutes the cooking temperature of 100° C. The curve of $T_v$ approaches the temperature line of the cooking temperature without any transient period. Also the period of time for the active power P is shown. P is here expressed as a percentage of the maximum power. The latter is switched off after about 6 minutes but is again switched in when the cooking temperature, after about 9 minutes, has sunk to the level of ready-cooking.

The lower part of the diagram contains the periods of time for $m_v$, $\phi_p$ and $R_{pk}$. The heat flow $\phi_p$ transmitted to the pan increases as expected with the temperature difference $(T_p - T_k)$ and reaches after about 5 minutes its end value which is about 1200 W. Very soon the thermal resistance $R_{pk}$ assumes a stable value amounting to about 0.20° C./W. The curve of the magnitude $m_v$ of the load presents greater variations but also the value of this magnitude becomes stable after about 3 minutes. In the example, $m_v$ corresponds to about 1.2 l of water, which also includes the thermal mass of the pan.

In connection with the iterative calculation of $T_{v\,end}$ also a corresponding end temperature of $T_p$ denoted $T_{p\,end}$ was determined. This temperature is of no importance during the heating process but can be used to determine the time at which the power is to be switched in again for a subsequent ready-cooking process. The advantage thereof is that $T_{p\,end}$ indicates a level of $T_p$ which prevails when the output and the input are in balance and which makes allowance for the thermal resistances $R_{pk}$ and $R_{kv}$. Thus, in case ready-cooking shall be at lowest possible cooking intensity the unit can control exactly at the temperature $T_{p\,end}$.

Another way of finding the time at which $T_p$ has fallen to the desired level is to switch in a thermostat when $T_{v\,end}$ has been attained and the power switch off, the thermostat switching in the power when the desired temperature of the cooking plate has been reached. However, this desired level of $T_p$ must be determined so as to be applicable to all cooking processes and it is not possible in a single process to pay regard to conditions such as that different cooking utensils may fit better or worse to the diameter of the cooking plate or that their abutment to the cooking plate likewise may be better or worse.

I claim:

1. A method of controlling the heating of an aqueous load in a cooking utensil, which is placed on an electrically heated cooking plate or hob, comprising collecting during the heating process at repeated occasions measured values relating to the temperature ($T_p$) of the cooking plate and the temperature ($T_k$) of the cooking utensil, respectively, calculating at each occasion of measurement an end temperature of the load ($T_{v\,end}$) from the collected measured values, which end temperature would be achieved if the power supply to the cooking plate was disrupted at that time and disrupting said power supply at the time the calculated end temperature ($T_{v\,end}$) equals a preset temperature value.

2. A method according to claim 1, comprising calculating the end temperature of the load ($T_{v\,end}$) as a function of the temperature of the cooking plate ($T_p$), the calculated temperature of the load ($T_{v\,calc}$), the thermal resistance ($R_{pk}$) between the cooking plate and the cooking utensil, the thermal mass ($m_v$) of the load and losses in the cooking plate $\phi_{p\,loss}$ as well as in the load ($\phi_{v\,loss}$).

3. A method according to claim 2, comprising calculating the calculated temperature of the load, $T_{v\,calc}$, according to the relation $$T_{v\,calc} = T_k - R_{kv}/R_{pk} \cdot (T_p - T_k),$$

where
$T_k$ is the temperature of the cooking utensil,
$R_{kv}$ is an estimated value of the thermal resistance between the cooking utensil and the load according to the relation $$R_{kv} = a \cdot \sqrt{\frac{1}{T_k}},$$

$R_{pk}$ is the thermal resistance between the cooking plate and the cooking utensil, and
$T_p$ is the temperature of the cooking plate.

4. A method according to claim 3, comprising calculating the thermal resistance ($R_{pk}$) between the cooking plate and the cooking utensil according to the relation $$R_{pk} = (T_p - T_k)/\phi_p,$$

where
$\phi_p$ is the power supplied to the cooking utensil and calculated according to the relation $$\phi_p = P_{max} - \frac{dT_p}{dt} \cdot m_p - \phi_{p\,loss},$$

$P_{max}$ is the maximum power of the cooking plate,
$\phi_{p\,loss} = b \cdot T_p$ is the losses to the surrounding from the cooking plate and
$(dT_p)/(dt) \cdot m_p$ represents the power required for the heating of the cooking plate itself, where $m_p$ is the thermal mass of the cooking plate and $(dT_p)/(dt)$ is the time derivate of the cooking plate temperature.

5. A method according to claim 1, comprising calculating the thermal mass $m_v$ from the relation $$m_v = \frac{\phi_p}{\frac{dT_k}{dt}},$$

where $(dT_k)/(dt)$ is the time derivate the cooking utensil temperature.

6. A method according to claim 5, comprising determining the end temperature ($T_{v\ end}$) of the load by an iterative method comprising simulating for each pair of measured values ($T_k$, $T_p$) a temperature equalization process such that, firstly, the temperature ($T_{v\ calc}$) of the load is determined out of the measured temperature values ($T_k$, $T_p$) and then a corresponding calculation is made after the time intervals $\Delta t$, $2\Delta t$, $3\Delta t$ etc., out of the values of the cooking plate temperature ($T_p$) and the load temperature ($T_{v\ calc}$), as determined at the immediate preceding time point of calculation, where each calculated value of the load temperature ($T_{v\ calc}$) is compared with the preceding value and the end temperature of the load ($T_{v\ end}$) is determined to be the first value of the load temperature ($T_{v\ calc}$) that falls below the immediate preceding value.

7. A method according to claim 6, comprising determining for each pair of measured values ($T_k$, $T_p$) the load temperature ($T_{v\ calc}$) and setting up the heat quantities $$\Delta Q_{p\ loss} = \phi_{p\ loss} \cdot \Delta t$$

$$\Delta Q_{v\ loss} = \phi_{v\ loss} \cdot \Delta t$$

$$\Delta Q_{pv} = \frac{T_p - T_{v\ calc}}{R_{pk}} \cdot \Delta t,$$

where $\phi_{v\ loss} = m \cdot T_{v\ calc}$ and m is a constant, the heat quantities being used for determining of new values of the cooking plate temperature ($T_p$) and the load temperature ($T_{v\ calc}$), respectively, according to the relations $$T_p(t + \Delta t) = T_p(t) - \frac{\Delta Q_{pv} + \Delta Q_{p\ loss}}{m_p}$$

$$T_{v\ calc}(t + \Delta t) = T_{v\ calc}(t) + \frac{\Delta Q_{pv} - \Delta Q_{v\ loss}}{m_v},$$

the value $T_{v\ calc}(t+\Delta t)$ being compared with the value $T_{v\ calc}(t)$ in determining the end temperature ($T_{v\ end}$) of the load.

8. A method according to claim 7, comprising determining the value of the cooking plate temperature ($T_{p\ end}$) which corresponds to the end temperature ($T_{v\ end}$) of the load and using it as the control temperature for the subsequent switching in of a lower heating power in a ready cooking process.

9. A method according to claim 1, comprising calculating the end temperature of the load even after the disruption of the power supply to the cooking plate and making correction by additional power pulses if the calculated temperature falls below the preset temperature value.

10. A method according to claim 1, wherein the preset temperature value is the cooking temperature of the load.

* * * * *